March 17, 1925.
G. A. RICHARDS
GREASE GUN
Filed March 27, 1922
1,529,918
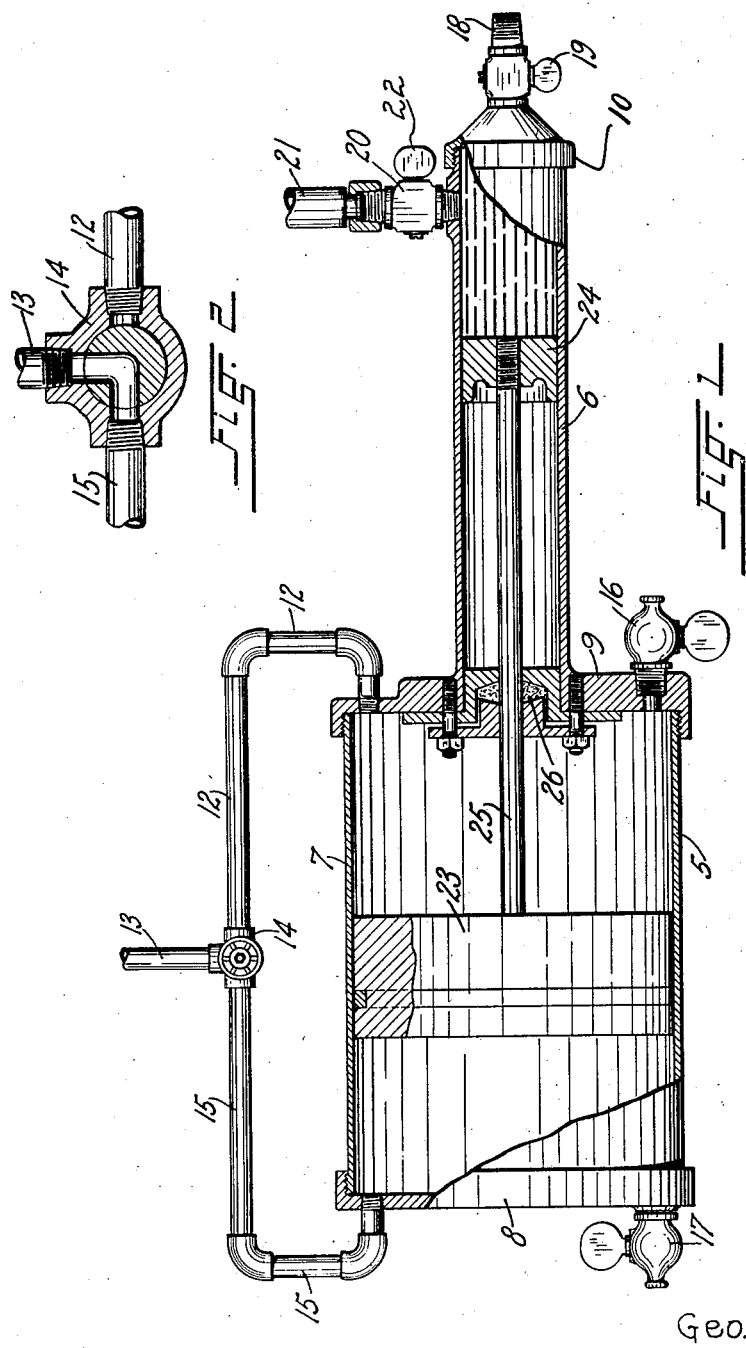
INVENTOR.
Geo. A. Richards.
BY
ATTORNEY.

Patented Mar. 17, 1925.

1,529,918

UNITED STATES PATENT OFFICE.

GEORGE A. RICHARDS, OF DENVER, COLORADO.

GREASE GUN.

Application filed March 27, 1922. Serial No. 547,188.

*To all whom it may concern:*

Be it known that I, GEORGE A. RICHARDS, a citizen of the United States, residing at Denver, in the county of Denver and State of Colorado, have invented certain new and useful Improvements in Grease Guns, of which the following is a specification.

My invention relates to improvements in filling devices for grease chambers and lubrication cups of automobiles, engines and other mechanical devices, and its principal object is to provide a portable appliance of very simple construction which as adapted to eject a charge of grease or other liquid or semi-liquid lubricant with a force greatly exceeding that of the pressure medium employed for its operation.

With this and other objects in view, my invention consists in the construction and arrangement of co-operating parts hereinafter to be described in detail and shown in suitable form and proportions in the accompanying drawing in which—

Figure 1 represents a sectional elevation of a preferred embodiment of the invention; and Figure 2 a section of the controlling valve drawn to an enlarged scale.

Referring more specifically to the drawing, my improved filling appliance consists of two cylinders 5 and 6 of different diameters which are connected in axial alinement with each other.

The larger cylinder 5 consists of a shell 7 and heads 8 and 9 which are fastened at the ends thereof, and the other cylinder 6 is preferably formed integrally with one of the heads and is closed at its outer end by means of a screw-cap 10. The heads which, in the construction shown in the drawing, are fastened at the ends of the cylindrical shell by means of screw-threads, are apertured for the connection of pipes 12 and 15 through which, in the operation of the device, a pressure fluid is introduced into the cylinder.

The two pipes are branches of a supply conduit 13 which connects with a source of fluid under pressure, and the flow of the fluid to the pipes is controlled by a manually adjusted two-way valve 14 connected at the point of their juncture with the main conduit.

The heads of the large cylinder are furthermore equipped with pet cocks 16 and 17 which in the operation, are opened by hand to release the pressure inside the cylinder.

The screw cap at the end of the small cylinder has a nozzle 18 adapted for the connection of a hose or other conduit, and it carries a valve 19 which controls the passage of a lubricant from the cylinder to the nozzle. The screw cap 10 is of conical form to provide a tapering approach to the nozzle in which the fluid is compressed by the movement of the piston 24 and which thus increases the speed with which the lubricant is discharged.

A screw-threaded or beaded nipple 20 attached to the small cylinder adjacent its outer cap-closed end, serves as a medium for the connection of a hose 21 or other conduit leading from a conveniently located source of lubricant supply, and a valve 22 in the nipple regulates the admission of the lubricant to the interior of the cylinder.

Slidably fitted in the two cylinders are pistons 23 and 24 which are rigidly connected by a stem 25 which passes through a stuffing box 26 on the head by which the cylinders are joined together.

In the operation of the device, the nozzle 18 at the end of the small cylinder, or the end of a hose or conduit attached thereto, is applied to an opening of the cup, chamber or space to be filled with the lubricating substance, the conduit 13 is connected with a source of pressure fluid, as for example, the compressed air tank found in public garages and filling stations, and the nipple 20 is connected with a supply of grease or other lubricant of like consistency.

By proper adjustment of the two-way valve 14, air under pressure is admitted to the forward end of the large cylinder and the air at the opposite end of the same is released by opening the pet cock 17.

The large piston is in consequence driven toward the rear end of its chamber and the corresponding movement of the small piston causes a charge of lubricant to enter the space behind it.

After the device has thus been loaded, the two-way valve is reversed, the pet cock 17 at the rear end of the large cylinder is closed and that at the opposite end of the same is opened, with the result that the connected pistons are driven in the opposite direction, and the charge of the small piston chamber is forcibly ejected through the nozzle at the end thereof with a pressure which is in ratio to the fluid pressure on the large piston as is the diameter of the latter to that of the other piston.

It will thus be seen that by the use of my invention, a lubricating cup or grease chamber may be filled in but a fraction of the time required in the ordinary method and without increase in the pressure of the air or the quantity consumed.

The device, being comparatively light and portable, can be used in garages and filling stations as a substitute for the so called "grease guns" which eject the lubricant by the movement of a single piston, and its use will cause a valuable saving of time and labor without increase of operating expense.

Having thus described my improved filler in the simplest and most practical form at present known to me, I desire it understood that changes in the construction, proportions and the arrangement of the parts may be resorted to without departing from the principle of the invention as defined in the hereunto appended claim.

What I claim and desire to secure by Letters Patent is:

In a grease gun, a power cylinder, removable heads for the ends of said power cylinder, a grease receiving and discharging cylinder of a smaller diameter than the power cylinder carried by one of said heads, pistons in the cylinders, a single piston rod slidable through the cylinder carrying head and connecting said pistons, selective control means for admitting pressure into said power cylinder at opposite sides of the piston, valves carried by the heads for exhausting pressure from said power cylinder, an outlet nozzle at the outer end of said grease receiving cylinder, and a valved conduit connected with the grease receiving cylinder to admit a supply of grease to said cylinder upon the return power stroke of the pistons whereby a continuous operation is permitted.

In testimony whereof I have affixed my signature.

GEORGE A. RICHARDS.